US011548466B2

United States Patent
Disam et al.

(10) Patent No.: US 11,548,466 B2
(45) Date of Patent: Jan. 10, 2023

(54) ASSEMBLY COMPRISING A DIFFUSER AND A GAS GENERATOR, AIRBAG MODULE AND METHOD FOR INSTALLING AN ASSEMBLY

(71) Applicant: ZF AUTOMOTIVE GERMANY GMBH, Alfdorf (DE)

(72) Inventors: Robert Disam, Mutlangen (DE); Anton Fischer, Schechingen-Leinweiler (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/281,282

(22) PCT Filed: Sep. 10, 2019

(86) PCT No.: PCT/EP2019/074079
§ 371 (c)(1),
(2) Date: Mar. 30, 2021

(87) PCT Pub. No.: WO2020/069823
PCT Pub. Date: Apr. 9, 2020

(65) Prior Publication Data
US 2022/0001826 A1     Jan. 6, 2022

(30) Foreign Application Priority Data

Oct. 2, 2018   (DE) .................... 10 2018 124 300.6
Jan. 8, 2019   (DE) .................... 10 2019 100 262.1

(51) Int. Cl.
*B60R 21/217*   (2011.01)
*B60R 21/261*   (2011.01)
*B60R 21/262*   (2011.01)

(52) U.S. Cl.
CPC ........ *B60R 21/2171* (2013.01); *B60R 21/262* (2013.01); *B60R 2021/2612* (2013.01)

(58) Field of Classification Search
CPC . B60R 21/262; B60R 21/217; B60R 21/2171; B60R 2021/2612; B60R 2021/2617
See application file for complete search history.

(56) References Cited

U.S. PATENT DOCUMENTS 5,186,492 A * 2/1993 Wright ................ B60R 21/2171
                                                  280/728.2
5,692,768 A * 12/1997 Mihm ................... B60R 21/217
                                                  280/728.2
(Continued)

FOREIGN PATENT DOCUMENTS

DE     29907617 U1    9/1999
DE     19850448 A1    5/2000
(Continued)

OTHER PUBLICATIONS

PCT International Search Report for corresponding International Application Serial No. PCT/EP2019/074079, dated Nov. 15, 2019, pp. 1-4.

*Primary Examiner* — Barry Gooden, Jr.
(74) *Attorney, Agent, or Firm* — Tarolli, Sundheim, Covell & Tummino LLP

(57) ABSTRACT

In an assembly (20) of an elongate inflator (10) which has an outer housing (14) with outflow openings (18) spread along the circumference (U) and defining an outflow area (16) and an outflow direction, and of a clamp-type diffusor (22) enclosing the outflow area (16), the diffusor (22) includes a central receiving opening (24) into which the outer housing (14) protrudes so that the diffusor (22) circumferentially encloses an axial portion of the outer housing (14) which comprises the outflow area (16). At the inner side of the diffusor (22) delimiting the receiving opening (24) at least one bearing surface (34) and at least one gas guiding surface (30) are provided, wherein the bearing surface (34) bears directly against the outer housing (14) of the inflator (10)
(Continued)

and the gas guiding surface (30) is radially spaced apart from the outer housing (14) while forming at least one collecting chamber (30) into which gas flowing out of the outflow area (16) is flowing. The collecting chamber (32) opens into at least one outlet opening (36) through which gas exits the diffusor (22) in an outlet direction (RD) transversely to the outflow direction out of the inflator (10).

21 Claims, 10 Drawing Sheets

(56) References Cited

U.S. PATENT DOCUMENTS

| | | | | |
|---|---|---|---|---|
| 6,860,506 | B2 * | 3/2005 | Ogata | B60R 21/232 280/728.2 |
| 7,354,062 | B2 * | 4/2008 | Heigl | B60R 21/232 280/740 |
| 7,644,950 | B2 * | 1/2010 | Kloss | B60R 21/26 280/740 |
| 8,613,468 | B2 * | 12/2013 | Maruyama | B60R 21/2171 280/740 |
| 2003/0094798 | A1 | 5/2003 | Ogata et al. | |
| 2005/0248134 | A1 * | 11/2005 | Heigl | B60R 21/232 280/730.2 |
| 2006/0103119 | A1 | 5/2006 | Kurimoto et al. | |
| 2006/0186644 | A1 * | 8/2006 | Manire | B60R 21/2171 280/728.2 |
| 2011/0316264 | A1 | 12/2011 | Maruyama | |
| 2012/0248747 | A1 | 10/2012 | Sugimoto et al. | |
| 2013/0048760 | A1 | 2/2013 | Iwakiri | |
| 2022/0266788 | A1 * | 8/2022 | Weber | B60R 21/262 |

FOREIGN PATENT DOCUMENTS

| | | |
|---|---|---|
| DE | 69802221 T2 | 6/2002 |
| DE | 102004022732 B3 | 12/2005 |
| DE | 112004001700 T5 | 8/2006 |
| DE | 102006048525 A1 | 5/2007 |
| DE | 102008029903 A1 | 12/2009 |
| DE | 102010039902 A1 | 3/2012 |
| DE | 112009004386 B4 | 2/2016 |
| WO | 2002/057120 A1 | 7/2002 |
| WO | 2011/070969 A1 | 6/2011 |

* cited by examiner

ASSEMBLY COMPRISING A DIFFUSER AND A GAS GENERATOR, AIRBAG MODULE AND METHOD FOR INSTALLING AN ASSEMBLY

RELATED APPLICATIONS

The present invention is a U.S. National Stage under 35 USC 371 patent application, claiming priority to Serial No. PCT/EP2019/074079, filed on 10 Sep. 2019; which claims priority from 10 2018 124 300.6, filed 2 Oct. 2018 and 10 2019 100 262.1, filed 8 Jan. 2019, the entirety of which are incorporated herein by reference.

TECHNICAL FIELD

The invention relates to an assembly of an elongate inflator and a clamp-type diffusor enclosing an outflow area of the inflator. Further, the invention relates to an airbag module comprising such assembly and to methods for mounting such assembly.

BACKGROUND

In elongate inflators, also referred to as tubular inflators, the outflow area usually is formed by a plurality of outflow openings distributed over the circumference of an outer housing of the inflator. The outflow openings are frequently provided in a filter housing at an axial end of the inflator. Therefore, the gas flows out of the inflator in the radial direction. In order to keep the inflator thrust-neutral upon activation thereof, the outflow openings frequently are distributed evenly around the circumference.

In many airbag modules the inflator is arranged so that its outflow area is located inside the inflatable volume of the airbag. This design is found, for example, in curtain-type side airbags or else in side airbags which are installed in a seat back of a vehicle seat.

The airbag must be protected against the gas flow exiting the inflator. To this end, it is known, for example, to provide a specific fabric layer which surrounds the outflow area of the inflator in the circumferential direction and which both protects the airbag fabric and deflects the gas flow in the axial direction. An axially directed outflow offers the advantage that the gas can be better distributed within the airbag.

Moreover, it is known to provide a so-called gas lance which, as a main component, includes a tube section open at both ends and which is axially attached to an inflator to transfer the outflowing gas over a distance of several decimeters to an airbag disposed remote from the inflator. Although, in this way, a directed gas flow into the airbag can be generated, it is not possible, however, to dispose the outflow area of the inflator directly inside the airbag, thus inevitably causing the dimension of the airbag module to be increased.

SUMMARY

It is the object of the invention to provide an option for guiding the gas flowing out of the inflator into the airbag, while the construction dimension is small, the options of adaptation to different geometries are good and the manufacturing costs are low.

This object is achieved by an assembly comprising the features of claim 1. The assembly consists of an elongate inflator having an outer housing with outflow openings distributed along the circumference which define an outflow area and an outflow direction, and of a clamp-type diffusor enclosing the outflow area, with the diffusor including a central receiving opening into which the outer housing of the inflator protrudes so that the diffusor circumferentially encloses an axial portion of the outer housing that comprises the outflow area. On the inner side of the diffusor delimiting the receiving opening, at least one bearing surface and at least one gas guiding surface are provided, the bearing surface bearing directly against the outer housing and the gas guiding surface being radially spaced apart from the outer housing while forming at least one collecting chamber into which gas flowing out of the outflow area is flowing. The collecting chamber opens into at least one outlet opening through which gas exits the diffusor in an outlet direction transversely to the outflow direction from the inflator.

The diffusor simultaneously deflects the gas flowing out of the inflator into one or more desired directions and protects the environment against direct contact with the outflowing gas. Since the diffusor directly surrounds the outflow area of the inflator, it can be manufactured to have small dimensions.

The diffusor can be easily configured so that substantially the whole gas flowing out of the inflator flows into one or more collecting chambers.

Preferably, the diffusor is a formed sheet ring. For example, it may be materialized as a punched and bent part. This manufacturing method permits to easily design the diffusor for different inflator and airbag geometries and to adapt it, for example, to an axial length of the outflow area of the inflator or a diameter of the inflator as well as to predefine the desired number, location, position and/or direction of the outlet openings. Alternatively, the diffusor can be made of a tube element, especially a steel tube.

In order to reduce the space required where possible, the diffusor should be designed to be so short in the axial direction that it projects at most insignificantly from the axial end of the inflator and thus the axial length of the assembly corresponds substantially to the axial length of the inflator.

The diffusor can extend, in the axial direction, completely over the outflow area of the inflator so that the whole outflowing gas initially flows into the diffusor.

In this application, the term of "axial length" or of "axial direction" is always used with reference to the longitudinal axis of the inflator.

The outlet direction from the diffusor extends preferably axially with respect to the longitudinal axis of the inflator, viz. in parallel to the longitudinal axis thereof. The gas flowing out of the outflow area of the inflator is deflected especially about 90° transversely to its outflow direction.

Of preference, at least two outlet openings which are oppositely directed are provided. In this case, the gas exits the diffusor in two directions being opposed but each facing along the axial direction. This enables the gas to be distributed more quickly inside the airbag and can keep the inflator substantially or even completely thrust-neutral.

The volume of the collecting chamber as well as the surface area of the outlet openings can be selected so that substantially no excessive excess pressure vis-à-vis the gas exiting the outflow area is formed in the diffusor.

The two outlet openings may be opposed along the axial direction. The surface area of the two outlet openings may be selected to be equal or different in size. In general, the selection of the number, the surface area and the position of the outlet openings is at the discretion of those skilled in the art.

Depending on the geometry of the airbag to be filled, also two oppositely directed outlet openings spaced apart from each other in the circumferential direction can be provided, for example.

The outlet openings can be easily materialized in the diffusor by the gas guiding surface being located, adjacent to the outlet openings, radially further outward than in the at least one associated collecting chamber remote from the outlet openings. In other words, the collecting chamber widens in the radial direction at the transition to the outlet opening so that, especially in a radial section, the outlet opening occupies a larger surface area than the collecting chamber and the gas can flow out of the diffusor without increased resistance.

In the area of the outlet openings, for example, both the gas guiding surface and the contact surface may be spaced radially apart from the outer periphery of the inflator so that an opening penetrating in the axial direction is formed through the entire diffusor and is open at both ends, wherein the two open ends define the outlet openings.

Generally, the collecting chamber(s) can be delimited via the bearing surface(s) in the axial direction and/or in the circumferential direction, with an appropriate selection of the extension of the bearing surfaces allowing for any geometry of one or more collecting chambers. Further guiding elements for the outflowing gas are not required. The bearing surfaces basically may be spaced completely apart from each other or else may merge into each other in portions.

In one possible embodiment, the diffusor is designed so that at least one collecting chamber is provided which does not continuously extend in the circumferential direction and which opens into at least one outlet opening at its two circumferential ends. The collecting chamber may extend, for example, over an angular portion of from about 200° to 350° and especially from 220° to 270°.

Two or more collecting chambers separated from each other in the circumferential direction may be provided, each opening into at least one outlet opening. It is also imaginable that one outlet opening is associated with plural collecting chambers.

In another possible embodiment, a collecting chamber is provided that opens into an outlet opening at an axial end. In this case, the gas need not first be guided along the circumferential direction but can be deflected directly in the axial direction by the gas guiding surface.

For example, the outlet opening may be formed, for example, by a radial gap between the outer housing and the inner side of the diffusor, which facilitates fabrication of the diffusor. The radial expansion of the diffusor can be delimited, in this configuration, to the radial distance of the gas guiding surface from the outer wall of the inflator. In particular, the outlet opening may be formed between the inner side of the gas guiding surface and the outer contour of the inflator by an axially opened slit.

The two afore-described embodiments can also be combined, of course, so that the diffusor includes both at least one collecting chamber opening into an outlet opening in the circumferential direction and at least one collecting chamber opening into an outlet opening in the axial direction.

The at least one bearing surface can be used to divide the gas flow exiting the inflator into at least two partial flows. The extension of the bearing surface can help easily define the number of the outflow openings of the inflator located beneath the gas guiding surface which in turn determine the proportion of the entire filling gas arriving at the respective partial flow and being guided via the respective gas guiding surface to one of the outlet openings. Preferably, the individual partial flows are guided into different collecting chambers and, from there, to different outlet openings.

In one possible embodiment, the bearing surface only extends in the circumferential direction around the outer housing.

In another possible embodiment, the bearing surface extends helically around the outer housing.

One form of the bearing surface which is especially simple to configure and by which partial gas flows with different gas quantities can be produced provides that, with a bearing surface peripheral around the entire circumference of the inflator, two first portions extending only in the circumferential direction and two second portions extending inclined to the circumferential direction and to the axial direction are provided, the second portions joining the first portions. Preferably, the bearing surface separates two collecting chambers separated in the axial direction and each having at least one separate outlet opening. The selection of the length and the inclination of the second portions extending inclined to the axial direction determines the number of the outflow openings which supply the respective partial gas flow with gas.

In another embodiment, plural outlet openings can be arranged to be circumferentially distributed. Preferably, the outlet openings are separated by separation webs which at least partially form the bearing surfaces of the diffusor delimiting the collecting chamber in the axial direction. Those outlet openings arranged to be circumferentially distributed which interrupt the bearing surface distributed over the circumference are arranged especially on the front side of the diffusor and thus, in the mounted state of the diffusor, toward a longitudinal end of the inflator.

The diffusor of the assembly may comprise at least one detent element for being attached and fastened to the inflator. Preferably, the diffusor in such embodiment comprises two or more detent elements. The detent element is configured to engage in a bead for fastening and fixing the diffusor on the inflator. By locking, the diffusor is fixed on the inflator via a positive connection. The detent elements help fasten the diffusor to the inflator in a simple manner. In addition, it is still possible to additionally fasten the diffusor to the inflator by pressing or welding.

In one embodiment, the detent element is disposed in connection to a bearing surface of the diffusor. Such diffusor having one or more detent elements may preferably be made from spring steel, especially an austempered spring steel.

Usually, the outflow area is provided at an axial end of the inflator so that also the diffusor is disposed at an axial end of the inflator.

In one embodiment of the assembly, the outflow area of the inflator may be divided into at least two zones which are separated from each other by a separation area of the outer housing without outflow openings. The zones including the outflow openings are preferably configured as axial zones each having circumferentially distributed outflow openings.

In a typical embodiment, in the assembly a bearing surface of the diffusor is positioned in the separation area between the zones. The bearing surface positioned in the separation area divides the gas exiting the two zones into two separate partial gas flows. Preferably, the diffusor accordingly has two collecting chambers which are arranged adjacent to the bearing surface positioned in the separation area, and one collecting chamber at a time collects the gas exiting one of the two zones.

The collecting chamber at the rear in the axial direction in such embodiment has an outlet opening, for example, that is formed by an open portion in a rearward facing sidewall of the diffusor. A partial gas flow can exit said outlet opening in an outlet direction facing away from the longitudinal end of the inflator.

The collecting chamber at the front in the axial direction in such embodiment has a circumferentially peripheral outlet opening in the form of a radial gap, for example. A partial gas flow can exit said outlet opening in the opposite direction vis-à-vis the partial gas flow exiting the rear collecting chamber.

The zones of the outflow area of the inflator may exhibit a symmetric spreading of the outflow openings. In this way, the assembly can be designed to be thrust-neutral with respect to the gas flowing out of the inflator so that 50% of the gas exit through the outlet opening of the collecting chamber at the front in the axial direction and 50% of the gas exit through the outlet opening of the collecting chamber at the rear in the axial direction.

Alternatively, the zones of the outflow area of the inflator may also have a non-symmetric distribution of the outflow openings, thus causing an uneven distribution of the gas flow. By such proportionally uneven distribution of the gas flow, a substantially even filling of differently large airbag chambers disposed at the front and rear sides can be achieved, for example.

A substantial advantage of such assembly resides in the fact that the diffusor can be designed as a standard component and the percentage of gas distribution can be easily adapted by adapting the number of the outflow openings associated with the respective zones in the outflow area of the inflator.

The above-mentioned object is also achieved by an airbag module comprising an airbag and an afore-described assembly in which the diffusor is completely arranged in an inflatable inner volume of the airbag.

In this case, it is not necessary to seal the bearing surfaces completely against the outer surface of the inflator, as possible leakage flows exit inside the airbag and thus cannot reach the environment. Therefore, complex seals can be dispensed with, which further reduces the manufacturing costs.

For mounting an afore-mentioned assembly, a method comprising the following steps is provided. A one-piece diffusor blank is fabricated of sheet metal in a punching and bending process, with all bearing surfaces and all gas guiding surfaces being pre-formed. The diffusor blank is bent about the outflow area of the inflator, wherein it adopts the final shape of the diffusor. Finally, the diffusor blank in portions is fixed to itself so as to circumferentially close the same, with its clamp shape being imparted to the diffusor.

Preferably, the diffusor blank is pre-tensioned in the last step and is then welded to itself. For this purpose, e.g., a laser welding process can be applied.

The fixation advantageously takes place at an area where the edge portions of the diffusor blank are superimposed.

As an alternative, for mounting an above-mentioned assembly, a method comprising the following steps can be provided. A one-piece diffusor is fabricated of a tube element or of a sheet metal, with all bearing surfaces and all gas guiding surfaces being pre-formed. The diffusor pre-fabricated in this way is slipped onto the outflow area of the inflator. For fastening the diffusor to the inflator, a bearing surface of the diffusor is plastically deformed in the area of a bead of the inflator so that the bearing surface engages at least partially or in portions along the periphery in the bead and a positive connection is established. The plastic deformation of the bearing surface in the area of the bead preferably can be produced by a pressing tool.

In another alternative method for mounting the assembly, the following steps can be provided. A one-piece diffusor is fabricated of a closed tube element or of a sheet metal, with all bearing surfaces, all gas guiding surfaces and all detent elements being pre-formed. The diffusor is slipped onto the outflow area of the inflator so that the detent elements engage at least in portions along the circumference in the bead and a positive locking is formed. When the diffusor is slipped on, the bearing surfaces with adjacent detent elements are bending radially outward. Upon reaching the beads of the inflator, the detent elements engage in the beads of the inflator so that the positive locking/latching of the diffusor on the inflator can be achieved.

Is not required to directly fasten the diffusor on the outer wall of the inflator by any means other than by clamping and/or pressing, and thus this is usually not intended but nevertheless possible.

This type of fabrication renders the use of a diffusor according to the invention independent of the outer contour of the inflator along the longitudinal axis thereof.

The material preferably used is a sheet steel or a steel tube. Especially in a diffusor comprising a detent element, additionally a spring steel, especially an austempered spring steel, can be used.

BRIEF DESCRIPTION OF THE FIGURES

In the following, the invention will be illustrated in detail by way of plural embodiments and with reference to the attached drawings, wherein.

DETAILED DESCRIPTION

Figure 1:
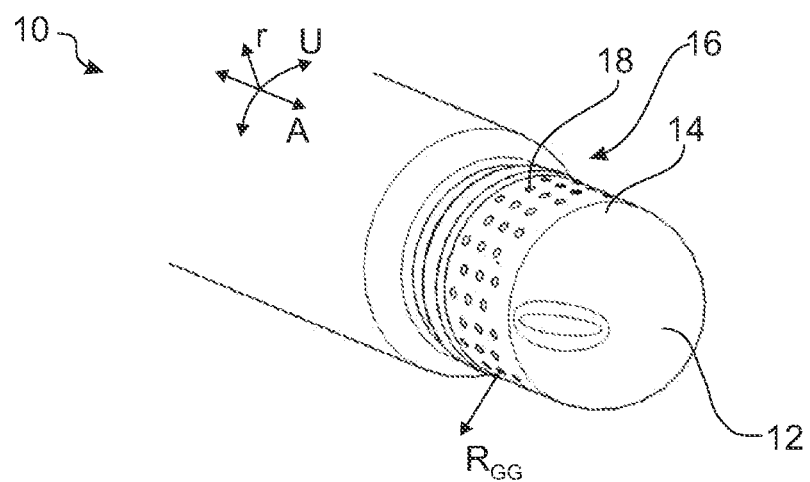
FIG. 1 shows a schematic perspective view of a longitudinal end of an inflator of an assembly according to the invention.

FIG. 1 illustrates an elongate inflator 10 that includes, at a longitudinal end 12 of its outer housing 14, an outflow area 16 with a plurality of individual outflow openings 18 distributed over the circumference. The outflow openings 18 in this case are formed in a filter housing of the inflator 10 which is part of the outer housing 14 of the inflator 10.

The outflow openings 18 are evenly distributed along the circumferential direction U in this case. At a cap sealing the longitudinal end 12 no outflow openings 18 are provided. When the inflator 10 is activated, the whole gas generated flows off through the outflow openings 18 of the outflow area 16 in an outflow direction RGG extending in the radial direction r.

Figure 2:
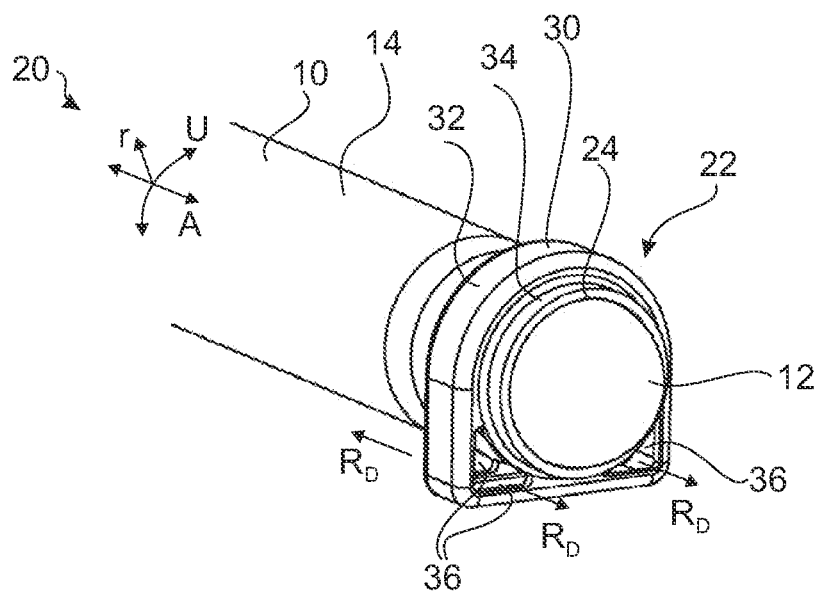
FIG. 2 shows a schematic perspective view of an assembly of an inflator and a diffusor according to the invention as set forth in a first embodiment.

In the first embodiment of an assembly 20 illustrated in FIG. 2, the outflow area 16 of the inflator 10 is surrounded by a clamp-type diffusor 22 in the circumferential direction U.

The diffusor 22 includes a central receiving opening 24 (see FIG. 3) into which and, in the shown case, also through which the outer housing 14 of the inflator 10 protrudes. In this embodiment, the longitudinal end 12 of the inflator 10, more exactly speaking the cap thereof having no outflow openings, extends in the axial direction A (along the longitudinal axis of the inflator 10) a short distance beyond the diffusor 22. This is also visible in FIG. 4.

Figure 4:
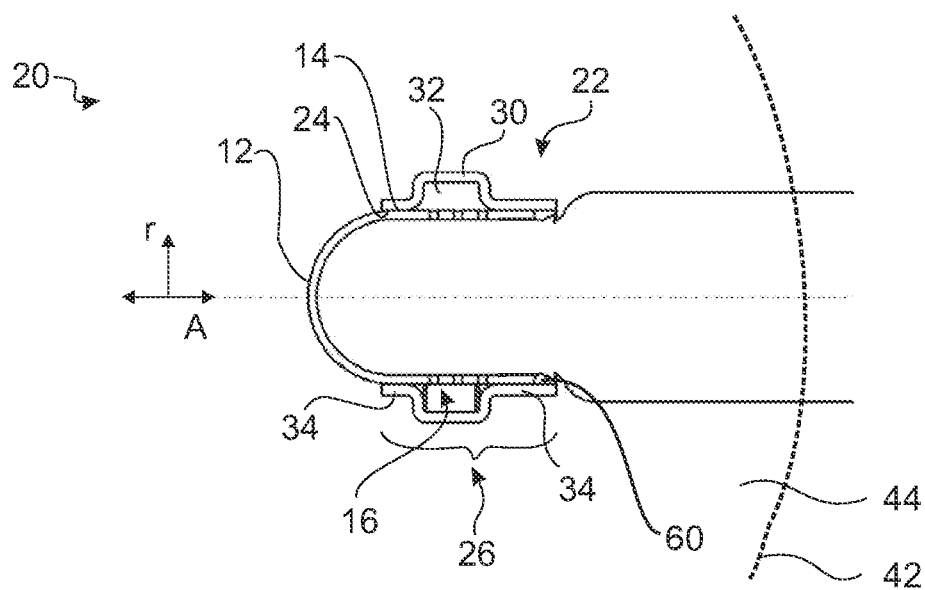
FIG. 4 shows an airbag module according to the invention including an assembly from FIG. 2 in a longitudinal sectional view.

Along the axial direction A, the diffusor 22 extends merely over a portion 26 that comprises the outflow area 16 and is only slightly wider than the outflow area 16 (see e.g., FIG. 4).

A gas guiding surface 30 extending over a large portion of the circumference of the outflow area 16, here over about 225°, is formed on the inner side 28 of the receiving opening 24 of the diffusor 22.

The gas guiding surface 30 is spaced apart from the outer housing 14 and the outflow openings 18 in the radial direction r so that gas exiting the outflow openings 18 flows into the clearance between the outer housing 14 of the inflator 10 and the gas guiding surface 30, when the inflator 10 is activated. The space between the gas guiding surface 30 and the outer housing 14 thus forms a collecting chamber 32 for the gas flowing out of the inflator 10.

The collecting chamber 32 is delimited, in the axial direction A, by two bearing surfaces 34 that bear directly against the outer housing 14 of the inflator 10. In this example, both bearing surfaces 34 extend over the entire circumference of the inflator 10 so that the collecting chamber 32 is sealed in the axial direction A by the two bearing surfaces 34.

The bearing surfaces 34 also provide for a connection of the diffusor 22 to the inflator 10. Being under mechanical stress, they bear against the outer housing 14 of the inflator 10 and retain the diffusor 22 on the outer housing 14 via a clamping force.

The diffusor 22 has plural outlet openings 36 which are fluid-communicated with the collecting chamber 32 and out of which the gas flowing out of the inflator 10 exits the diffusor 22 and thus the assembly 20.

The collecting chamber 32 at each of its two peripheral ends 47 opens into two outlet openings 36 opposed in the axial direction A. In the examples shown here, the surface of each of the outlet openings 36 is perpendicular to the axial direction A so that the gas exits the assembly 20 in an outlet direction RD along the axial direction A.

In this embodiment, a total of four outlet openings 36 are provided two of which are directed in opposite directions so that the gas flows out along the axial direction A in two opposite outlet directions RD. Opposite to the outflow direction RGG, the outflowing gas is deflected, in this example, about 90° from the radial direction r to the axial direction A.

In this example, the surface area of all outlet openings 36 is selected to be equal. Thus, the assembly 20 is thrust-neutral with respect to the gas flowing out of the inflator 10. The surface area of the outlet openings 36 opposite in the axial direction A alternatively may also be selected to have a different size so that an uneven gas distribution is achieved (not shown).

The outlet openings 36 in this embodiment are formed by the gas guiding surface 30 in an outlet area 38 having a larger distance in the radial direction r from the outer housing 14 of the inflator 10 than in the area of the collecting chamber 32. In the outlet area 38, a sidewall 40 connecting the gas guiding surface 30 and the adjacent bearing surface 34 is interrupted so that the outlet opening 36 is formed.

In this embodiment, the outlet openings 36 are arranged symmetrically relative to each other in both opposite sidewalls 40.

Figure 3:
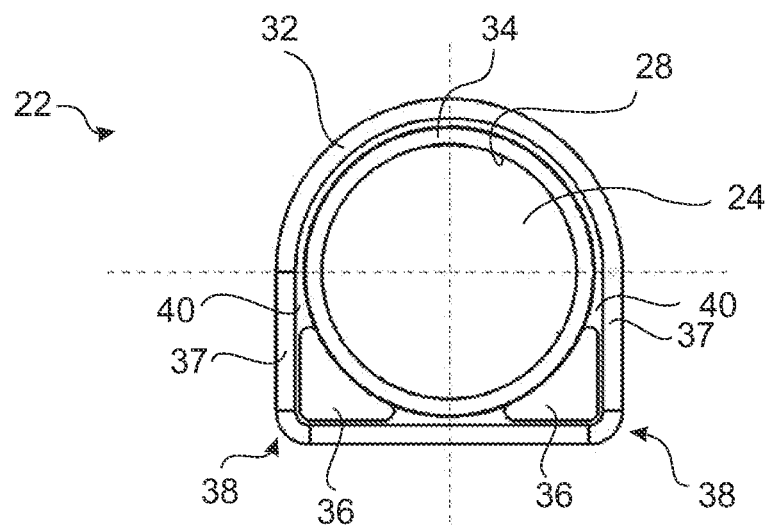
FIG. 3 shows the diffusor from FIG. 2 in a front view.

Here, two outlet areas 38 spatially separated from each other and each having two opposite outlet openings 36 are provided which are spaced along the circumferential direction by about 90° (see FIGS. 2 and 3).

Optionally, between said two outlet areas 38 another small collecting chamber 32 is formed, but it is also possible that the gas guiding surface 30 there substantially bears against the outer housing 14 of the inflator 10 and covers some of the outflow openings 18, where appropriate.

When the assembly 20 is installed in an airbag module, the inflator 10 is inserted into an airbag 42 so far that the longitudinal end 12 of the inflator 10 including the outflow area 16 and the diffusor 22 is completely located inside an inflatable inner volume 44 of the airbag 42. This is indicated in FIG. 4.

Therefore, it is not necessary for the bearing surfaces 34 to seal the collecting chamber 32 gas-tightly to the outside, as the whole gas flowing out of the inflator 10 is released inside the airbag 42. Therefore, small leakage flows can be accepted.

The diffusor 22 is manufactured by forming a sheet strip, for example made of sheet steel, into a diffusor blank in a punching and bending process (not shown). In this work step, all gas guiding surfaces 30 and bearing surfaces 34 are pre-formed. Said diffusor blank is bent, in another forming step, around the outflow area 16 of the inflator 10 in the circumferential direction U, wherein the bearing surfaces 34 come into bearing contact with the outer housing 14 of the inflator 10 and also the gas guiding surfaces 30 adopt their final positions so that the desired collecting chamber(s) 32 is/are formed between the gas guiding surfaces 30 and the outer housing 14.

In an overlapping portion 46 (see FIGS. 5 and 6), portions of the diffusor blank are superimposed in the radial direction r and are in contact with each other. In said overlapping portion 46, the diffusor blank is fastened to itself, for example by a suitable welding process such as laser welding. The resulting weld 48 clamps the finished diffusor 22 to the inflator 10 under mechanical pretension. The diffusor blank is attached merely to itself by a material bond, but not to the inflator 10 by a material bond.

In addition, the diffusor 22 can be fastened to the inflator 10 by a suitable joining process such as crimping. For this purpose, the inflator 10 may include a bead 60 (see FIG. 4). For connecting the diffusor 22 to the inflator 10, the bearing surface 34 of the diffusor is plastically deformed in the region of the bead 60 so that at least portions of the bearing surface engage in the bead 60 along the circumference and a positive locking 62 is formed (see FIG. 6).

Alternatively, the diffusor 22 may be completely pre-formed already before it is applied to the outflow area 16. Such diffusor 22 can equally be manufactured of a sheet strip by a punching and bending process or of a tube element such as a steel tube. Preferably, such diffusor 22 is fastened onto the inflator 10, as afore-described, by a suitable joining process such as through a pressing tool.

Figure 5:
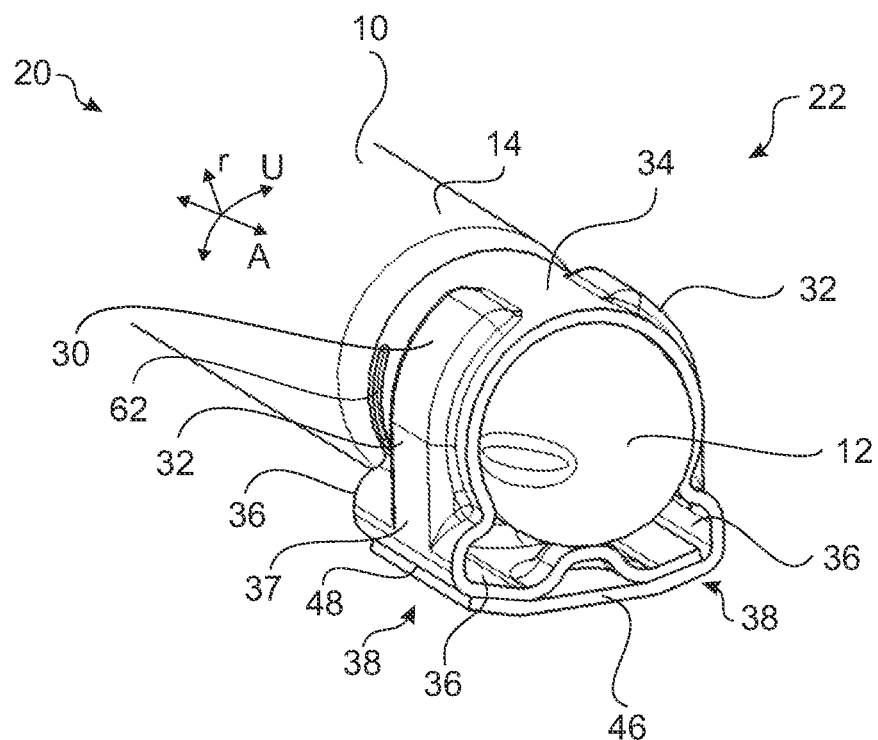
FIG. 5 shows a schematic perspective view of an assembly of an inflator and a diffusor according to the invention as set forth in a second embodiment.
Figure 6:
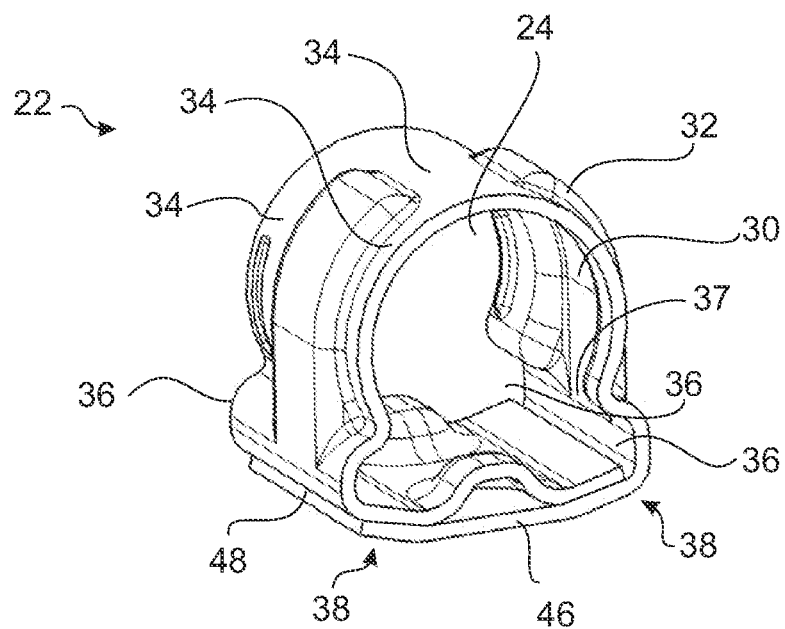
FIG. 6 shows a schematic perspective view of the diffusor from FIG. 5.

FIGS. 5 and 6 illustrate an assembly 20 according to a second embodiment. Since the individual elements only differ by their shape and position rather than by their function, the already introduced reference numerals shall be maintained.

In the second embodiment, the diffusor 22 is configured so that two collecting chambers 32 are formed which are spaced apart from each other along the circumferential direction U and each of which opens into a separate outlet area 38. Each of the outlet areas has two outlet openings 36 which are arranged at opposed axial ends of the diffusor 22 and the surface of which is directed in opposite directions along the axial direction A. Along the axial direction A, the outlet area 38 is continuous and the collecting chamber 32 opens centrally into the outlet area 38. In the circumferential direction U between the two collecting chambers 32 and between the two outlet areas 38, the bearing surface 34 bears directly against the outer housing 14 of the inflator 10.

The overlapping portion 46 in this example extends in the region of the two outlet areas 38 so that the sheet metal from which the diffusor 22 is made in this portion is double-layered and is fixed to each other at an appropriate position, here indicated by the weld 48.

In this embodiment, too, the gas exiting the outflow area 16 of the inflator 10 in the radial direction r is initially deflected by the gas guiding surface 30 about 90° into the collecting chambers 20, in the latter is guided to the outlet areas 38 where it is deflected about 90° again and is divided into two partial gas flows which, in the shown embodiment, exit the diffusor 22 substantially in equal intensity in opposite directions along the axial direction A. The gas volume in the individual partial gas flows is defined by the number of the outflow openings 18 in the region of the individual collecting chambers 32.

The number, the arrangement, the shape and the size of the individual collecting chambers 32, outlet areas 38 and outlet openings 36 are at the discretion of those skilled in the art, of course, and may be adapted for the respective inflator 10 and the respective application. In particular, the number, the arrangement, the shape and the size of the individual collecting chambers 32, outlet areas 38 and outlet openings 36 may also be configured so that an uneven gas distribution is effectuated.

Figure 7:
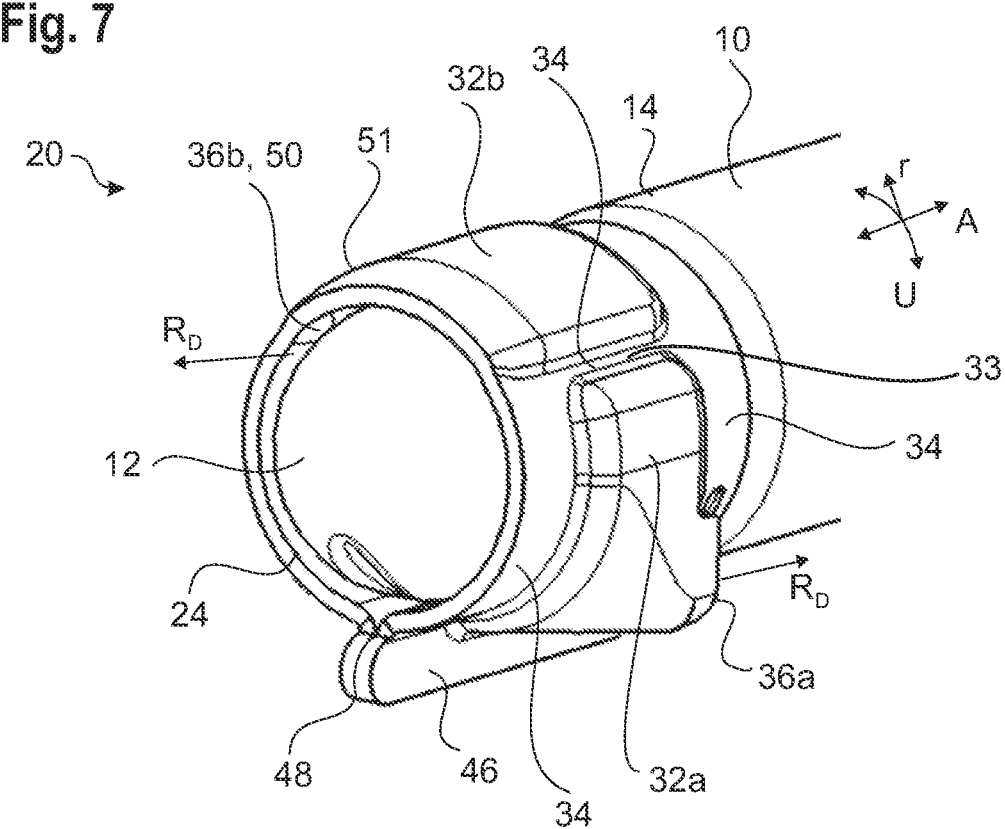
FIG. 7 shows a schematic perspective view of an assembly of an inflator and a diffusor according to the invention as set forth in a third embodiment.
Figure 8:
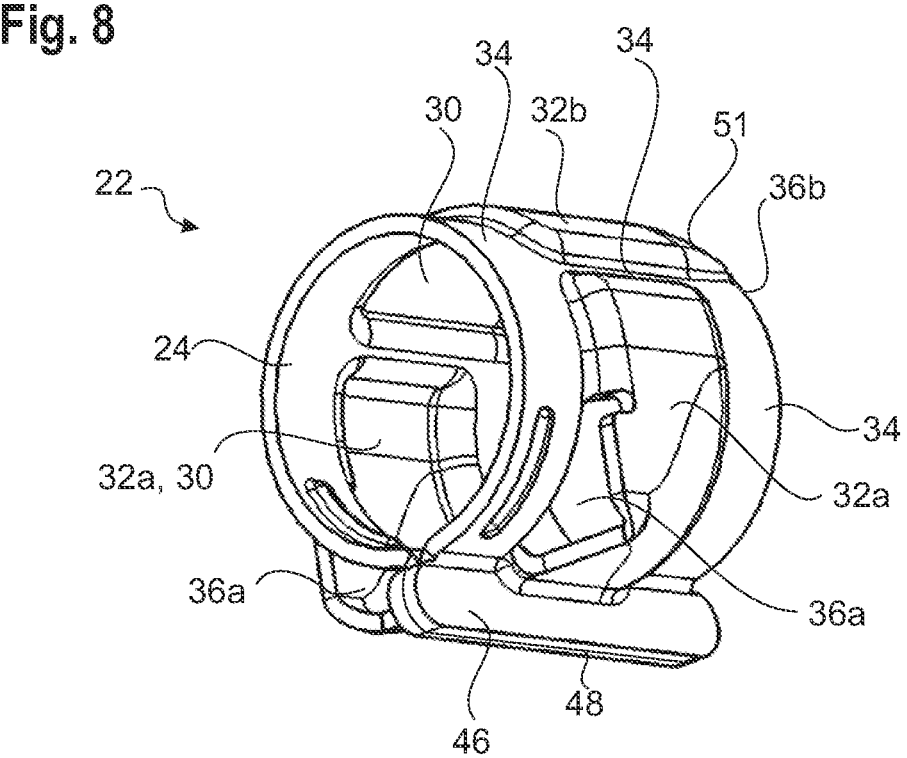
FIG. 8 shows the diffusor from FIG. 7 in a rear view.

FIGS. 7 and 8 illustrate a third embodiment of an assembly 20. In contrast to the just described embodiment, in the overlapping portion 46 the diffusor blank is not superimposed in the radial direction r, but two portions of the diffusor blank abut against each other along the circumferential direction U and are adjacent each other along the axial direction A and along the radial direction r. As afore-described, the diffusor blank in this portion is fixed to itself, shown here by a weld 48.

It is another difference from the just described embodiment that a total of three collecting chambers 32a, 32b are provided each of which opens into one single outlet opening 36a, 36b. FIG. 7 shows the diffusor 22 in a front view from the longitudinal end 12 of the inflator 10, whereas FIG. 8 illustrates the diffusor 22 in a rear view.

Two first collecting chambers 32a are spaced apart from each other in the circumferential direction U and are shaped mirror-inverted with respect to a diameter of the inflator 10. The gas guiding surface 30 in said two first collecting chambers 32a is shaped such that a respective rearward directed outlet opening 36a is formed.

The third collecting chamber 32b is located along the circumferential direction U between the two first described collecting chambers 32a. It has one single outlet opening 36b formed by a radial gap 50 between the diffusor 22 and the outer housing 14 of the inflator 10 and thus equally orientated with its surface area perpendicularly to the axial direction A so that gas flows out in an outlet direction RD in parallel to the axial direction A, however directed forward and thus opposed to the gas exiting the outlet openings 36a.

The outlet opening 36b is located at an axial end 51 of the second collecting chamber 32b.

Just as in the other embodiments, the surfaces of the individual outlet openings 36a, 36b, optionally 36, as well as the size of the collecting chambers 32a, 32b, optionally 32, are selected such that the assembly 20 is substantially thrust-neutral.

Alternatively, also in this case an uneven gas distribution is possible by adapting the surface areas of the individual outlet openings 36a, 36b as well as the size of the collecting chambers 32a, 32b, the size of the collecting chambers 32a, 32b being adaptable especially by the location of the separation web 33 formed by the bearing surface 34. Such proportionally uneven division of the gas flow can help obtain, for example, a substantially even filling of differently large airbag chambers disposed on the front and rear sides.

At the rear axial end of the diffusor 22, a bearing surface 34 extends over the entire circumference of the inflator 10. A bearing surface 34 at the front axial end of the diffusor 22 is interrupted in the area of the second collecting chamber 32b. This portion forms the radial gap 50.

In general, here the longitudinal end 12 is considered to be the front end of the inflator 10. Terms such as "front" and "rear" relate to this orientation.

Figure 10:
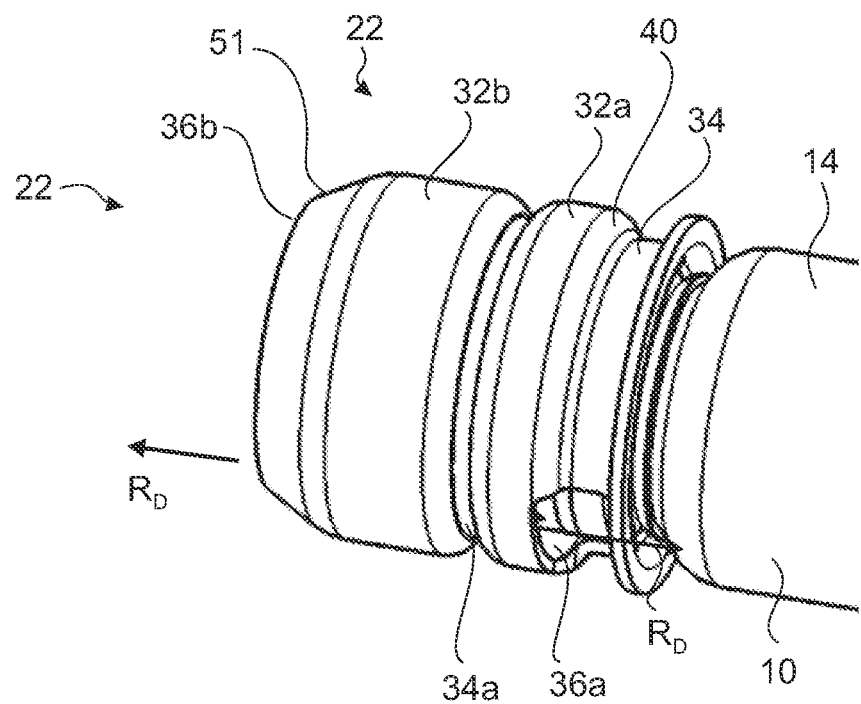
FIG. 10 shows a schematic perspective view of an assembly of an inflator and a diffusor according to the invention as set forth in a fourth embodiment.
Figure 11:
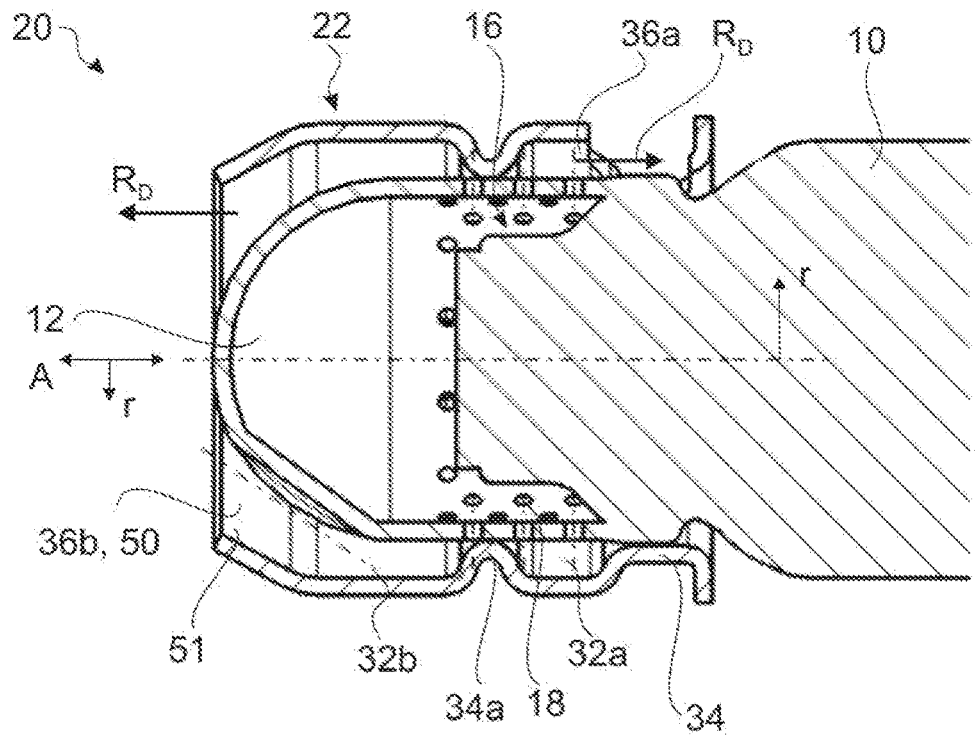
FIG. 11 shows a schematic longitudinal sectional view of the assembly from FIG. 10.

FIGS. 10 and 11 show an assembly 20 according to a fourth embodiment.

This diffusor geometry, too, can be manufactured from a strip-shaped sheet or a tube element, such as by a punching and bending process. Alternatively, the diffusor can also be manufactured as a helically welded, seamlessly drawn or sheet-drawn component.

Figure 9:
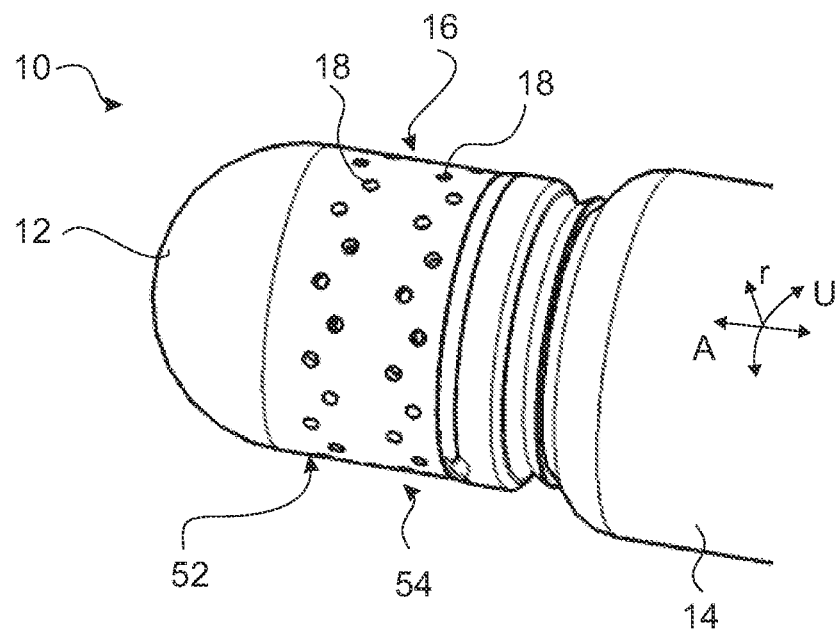
FIG. 9 shows a schematic perspective view of a longitudinal end of an inflator of an assembly according to the invention.

In this case, especially an inflator 10 as shown in FIG. 9 can be used. The only difference from the inflator shown in FIG. 1 resides in the fact that in the axial direction A the outflow area 16 is divided into two axial zones 52, 54 separated from each other by a separation area of the outer housing 14 formed as a strip and having no outflow openings 18. Accordingly, especially for an uneven gas distribution, the zones 52 and 54 may be provided to exhibit a non-symmetric spreading of the outflow openings 18.

The diffusor 22 of this embodiment has a central bearing surface 34*a* positioned in the separation area between the two zones 52, 54. Thus, the central bearing surface 34*a* divides the gas exiting the two zones 52, 54 into two separate partial gas flows.

The diffusor has two collecting chambers that are arranged along the axial direction A adjacent to the bearing surface 34. In line with the just described embodiment, the reference numerals 32*a*, 32*b* are used for said collecting chambers.

Each of the collecting chambers 32*a*, 32*b* collects the gas exiting one of the zones 52, 54.

The rear collecting chamber 32*a* in this example includes one single outlet opening 36*a* which is formed by an open portion of a rearward facing sidewall 40 and from which a partial gas flow exits directed in an outlet direction RD away from the longitudinal end 12 of the inflator 10.

The front collecting chamber 32*b* in this example includes a circumferentially peripheral outlet opening 36*b* in the form of a radial gap 50 from which a partial gas flow exits in the opposite direction. This geometry is clearly visible in FIG. 11.

Figure 12:
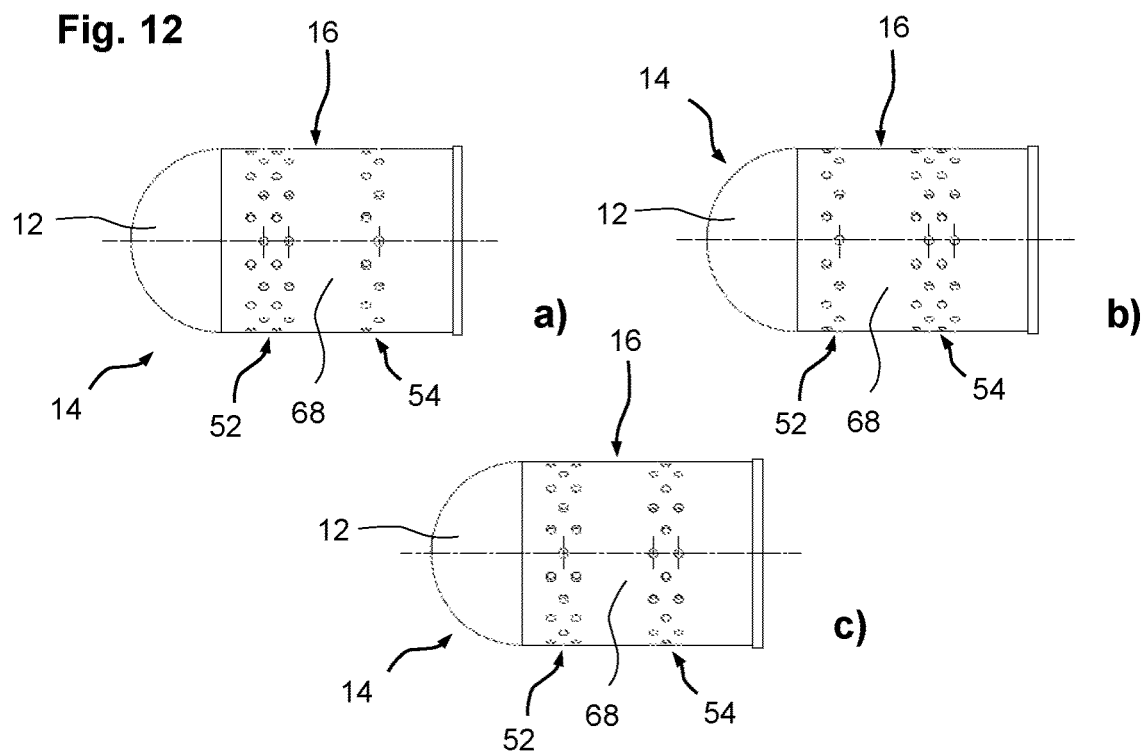
FIGS. 12 *a*) to *c*) show schematic views of different embodiments of a longitudinal end of an inflator of an assembly according to the invention.

Each of the FIGS. 12 *a*) to 12 *c*) illustrates the outer housing 14 of an inflator 10 in which in the axial direction A the outflow area 16 is divided into two axial zones 52, 54 separated from each other by a strip-shaped separation area 68 of the outer housing 14 without outflow openings 18.

In each of the FIGS. 12 *a*) and 12 *b*), an outer housing 14 of the inflator 10 is illustrated which is provided for an uneven gas distribution, wherein, for this purpose, the zones 52 and 54 show a non-symmetric spreading of the outflow openings 18. In FIG. 12 *a*), the outflow openings 18 are distributed to the zones 52 and 54 such that about two thirds of the gas flow exit in the area of the zone 52 and about one third of the gas flow exits in the zone 54. In FIG. 12 *b*), the outflow openings 18 are distributed to the zones 52 and 54 such that about one third of the gas flow exits in the area of the zone 52 and about two thirds of the gas flow exit in the zone 54.

In FIG. 12 *c*), an outer housing 14 of the inflator 10 is illustrated which is provided for an even gas distribution, wherein, for this purpose, the zones 52 and 54 show a symmetric spreading of the outflow openings 18 so that about half of the gas flow exits in each of the zone 52 and the zone 54.

a. As a matter of course, those skilled in the art can also produce other percentage ratios of the gas flow division by a spreading of the outflow openings 18 to the zones 52 and 54 adapted to the intended application of the assembly 20.

Figure 13:
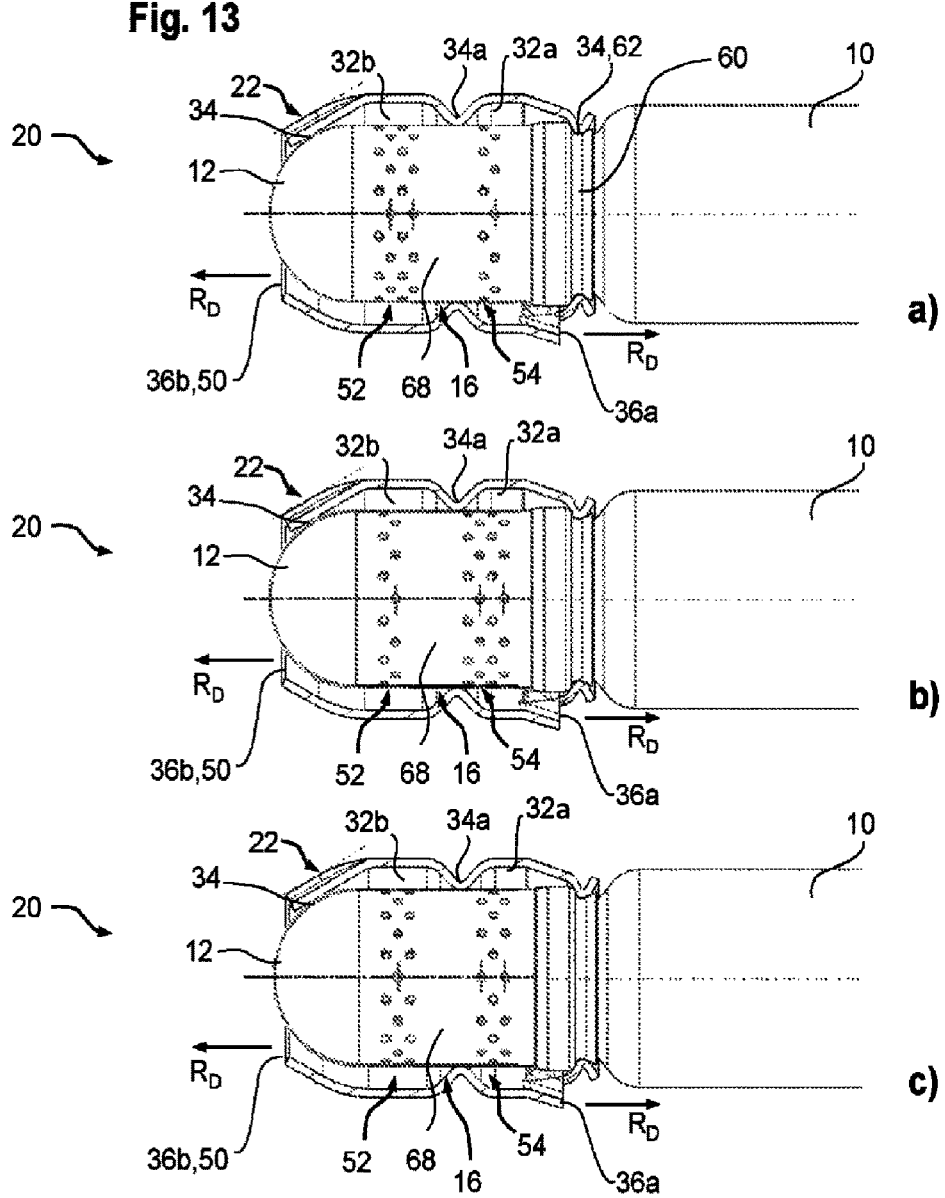
FIGS. 13 *a*) to *c*) show partly cut views of an assembly of an inflator with a diffusor according to the invention as set forth in a fifth embodiment.

Each of the FIGS. 13 *a*) to 13 *c*) illustrates an assembly according to a fifth embodiment, wherein in the outer housing 14 of the inflator 10 of the assembly 20, the outflow area 16 is divided in the axial direction A into two respective axial zones 52, 54 which are separated from each other by a strip-shaped separation area 68 of the outer housing 14 without outflow openings 18.

Figure 14:
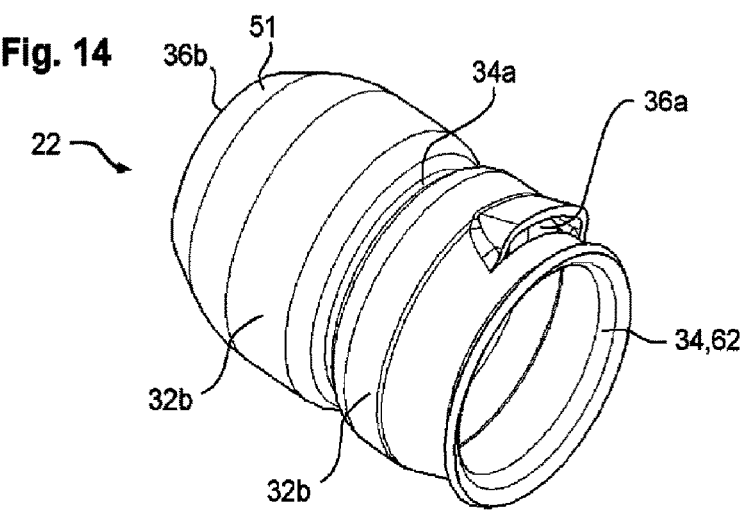
FIG. 14 shows a schematic perspective view of the diffusor from FIG. 13.

Also, the diffusor 22 of this embodiment (see FIG. 14) includes a central bearing surface 34*a* which is positioned in the separation area 68 between the two zones 52, 54. The diffusor 22 has two collecting chambers 32*a* and 32*b* which are arranged along the axial direction A adjacent to the bearing surface 34*a*. Each of the collecting chambers 32*a*, 32*b* collects the gas exiting one of the zones 52, 54. Thus, the central bearing surface 34*a* divides the gas exiting the two zones 52, 54 into two separate partial gas flows.

In FIG. 13 *a*), the outflow openings 18 are distributed to the zones 52 and 54 in such a manner that, in the area of the zone 52, about two thirds of the gas flow exit into the collecting chamber 32*b* and, in the zone 54, about one third of the gas flow exits into the collecting chamber 32*a*. In FIG. 13 *b*), the outflow openings 18 are distributed to the zones 52 and 54 in such a manner that, in the area of the zone 52, about one third of the gas flow exits into the collecting chamber 32*b* and, in the zone 54, about two thirds of the gas flow exit into the collecting chamber 32*a*. In FIG. 13 *c*), the outflow openings 18 are spread symmetrically/evenly to the zones 52 and 54 so that about half of the gas flow exits in the zone 52 into the collecting chamber 32*b* and about half of the gas flow exits in the zone 54 into the collecting chamber 32*a*.

The rear collecting chamber 32*a* in this example includes one single outlet opening 36*a* from which a partial gas flow exits in an outlet direction RD directed away from the longitudinal end 12 of the inflator 10. The front collecting chamber 32*a* in this example includes an outlet opening 36*b* in the form of a radial gap 50 from which a partial gas flow exits in the opposite direction. The gap 50 is interrupted, as is evident from FIGS. 13 *a*) to 13 *c*), in the shown example in the circumferential direction by the bearing surface 34 at the longitudinal end 12.

This diffusor geometry, too, can be manufactured from a strip-shaped sheet or a tube element, for example by a punching and bending process. Alternatively, also this diffusor may be manufactured as a helically welded, seamlessly drawn or sheet-drawn component.

It is the advantage of such assembly 20 according to the fifth embodiment that the diffusor 22 can be designed as a standard component: An adaptation of the percentage gas distribution that is especially dependent on the intended application of the assembly 20 can be caused by an adaptation of the outer housing 14 in a simple and inexpensive way. The adaptation of the outer housing 14 preferably takes place by an adaptation of the number of the outflow openings 18 associated with the respective zones 52 and 54 in the outflow area 16 of the outer housing 14 of the inflator 10.

Figure 15:
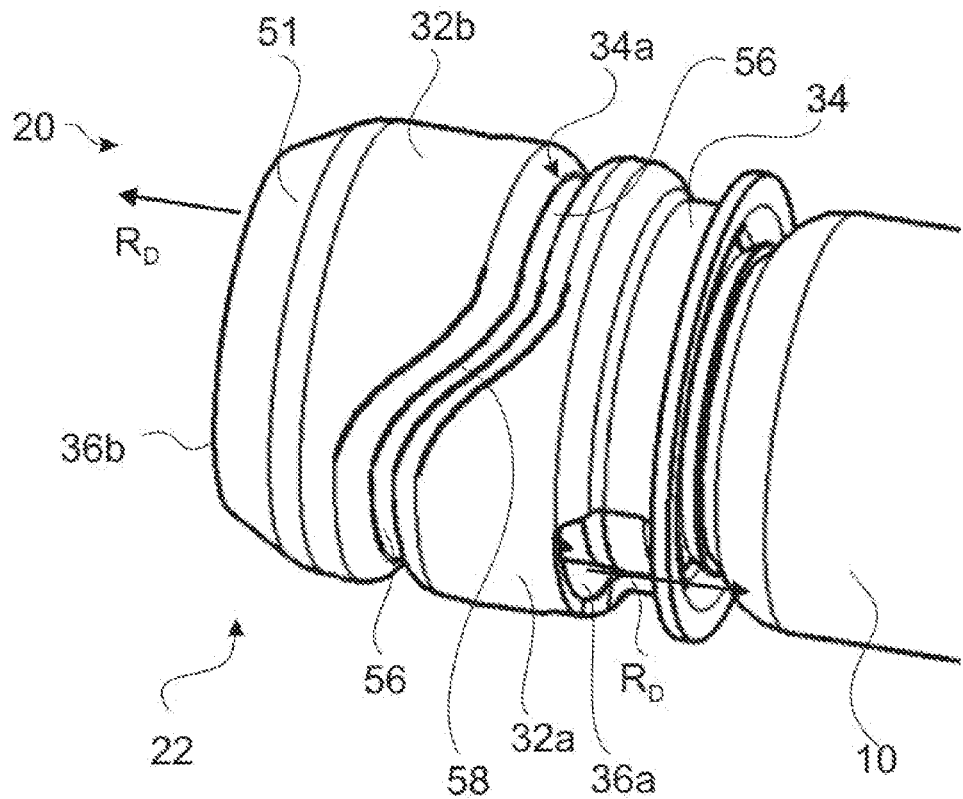
FIG. 15 shows a schematic perspective view of an assembly of an inflator and a diffusor according to the invention as set forth in a sixth embodiment.

FIG. 15 illustrates a sixth embodiment of an assembly 20. In contrast to the just described embodiment, the central bearing surface 34*a* is helical so that the axial width of the two collecting chambers 32*a*, 32*b* varies along the circumferential direction U.

The helical shape of the central bearing surface 34 is obtained by said bearing surface 34*a* including two first portions 56 which extend only along the circumferential direction U and which are arranged offset against each other along the axial direction A, as well as two second portions 58 which extend inclined with respect to the axial direction A and the circumferential direction U and which interconnect the first portions 56. This design helps define the size of the individual collecting chambers 32*a*, 32*b* that determine the intensity of the individual partial gas flows. This geometry can be employed both with an inflator according to FIG. 1 and with an inflator according to FIG. 9.

In this embodiment, too, the rear collecting chamber 32*a* has a rearward directed outlet opening 36*a*, whereas the front collecting chamber 32*b* includes a forward directed outlet opening 36*b* which is peripheral about the inflator 10 in the form of a radial gap at the front axial end 51 of the collecting chamber 32*b* in the circumferential direction U.

Figure 16:
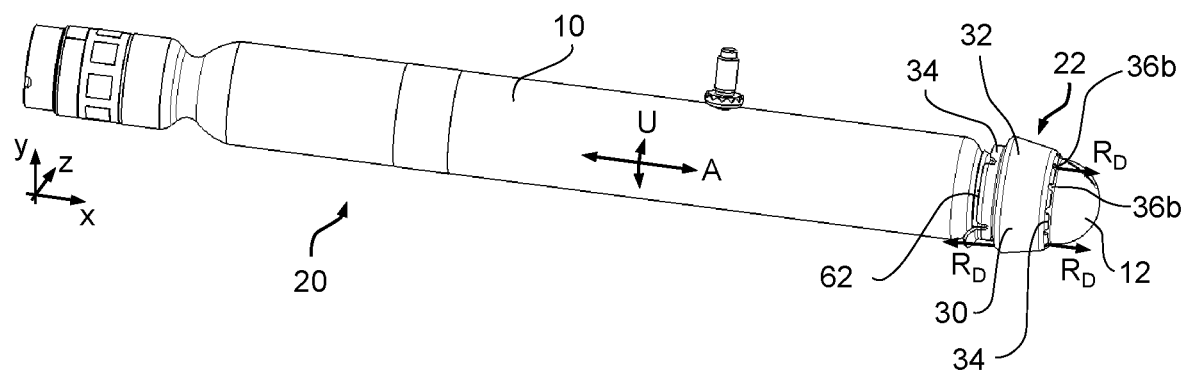
FIG. 16 shows a schematic perspective view of an assembly of an inflator and a diffusor according to the invention as set forth in a seventh embodiment.
Figure 17:
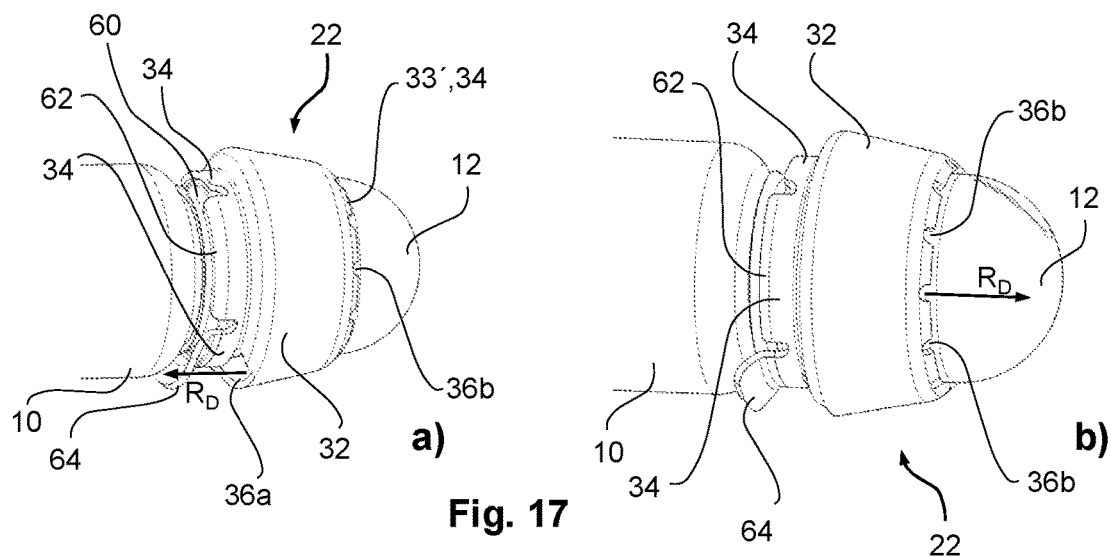
FIGS. 17 a) and b) show enlarged partial views onto a front longitudinal end of the inflator with the diffusor according to FIG. 16 in perspective a) rear and b) front views.
Figure 18:
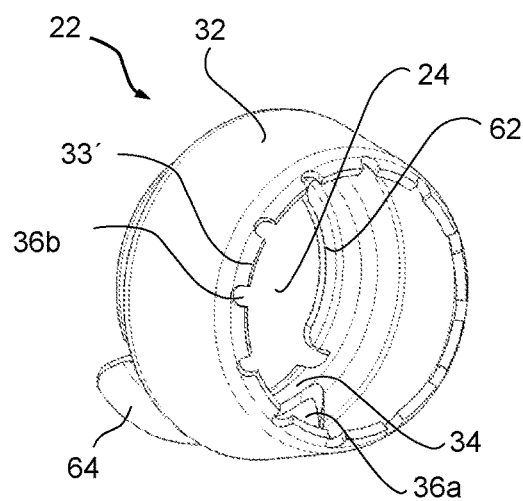
FIG. 18 shows the diffusor from FIG. 16 in a perspective front view.

FIGS. 16 to 21 illustrate an assembly 20 according to a seventh embodiment. FIG. 16 illustrates an inflator according to FIG. 1 to the longitudinal end 12 of which a self-locking diffusor 22 is attached. Similar to the first embodiment, the longitudinal end 12 of the inflator 10, more exactly speaking the cap thereof having no outflow openings, extends even in said sixth embodiment a short distance beyond the diffusor 22 in the axial direction A. This is clearly evident especially in FIGS. 17, 19 and 21.

The self-locking diffusor 22 is preferably made from spring steel. In the shown embodiment, the gas guiding surface 30 extends over the entire circumference. On the front side, the diffusor 22 has plural outlet openings 36*b* evenly spread over the circumference U here. The outlet openings 36*b* are separated by separation webs 33' which moreover form the front bearing surfaces 34 (see FIGS. 17*b* and 18).

Figure 19:
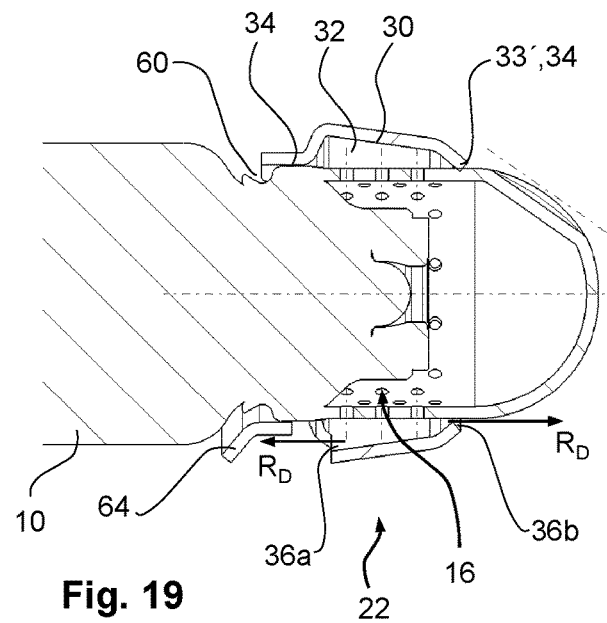
FIG. 19 shows a first schematic longitudinal section of the assembly from FIG. 16.

On the rear side, in the shown embodiment, the diffusor 22 includes an outlet opening 36*a* that is formed by an opening in portions in the rear area of the gas guiding surface 30 (see FIGS. 17*a* and 19). In the shown embodiment, an optional guiding element 64 is connected to the bearing surface 34 arranged in the area of the outlet opening 36*a*. Such guiding element 64 helps deflect the outlet direction RD of the gas into an outlet direction RD' (see FIG. 19).

The rear bearing surface 34 of the diffusor is divided, in the circumferential direction U, into plural portions by separating recesses 66. In the embodiment according to FIGS. 16 to 21, the rear bearing surface 64 comprises four portions. Detent elements 62 that engage in the bead 60 of the inflator 10 in a mounted state of the diffusor 22 are connected to two of said portions of the bearing surface 34 which in this case are arranged adjacent to the portion of the bearing surface 34 in the area of the outlet opening 36*a*.

Figure 20:
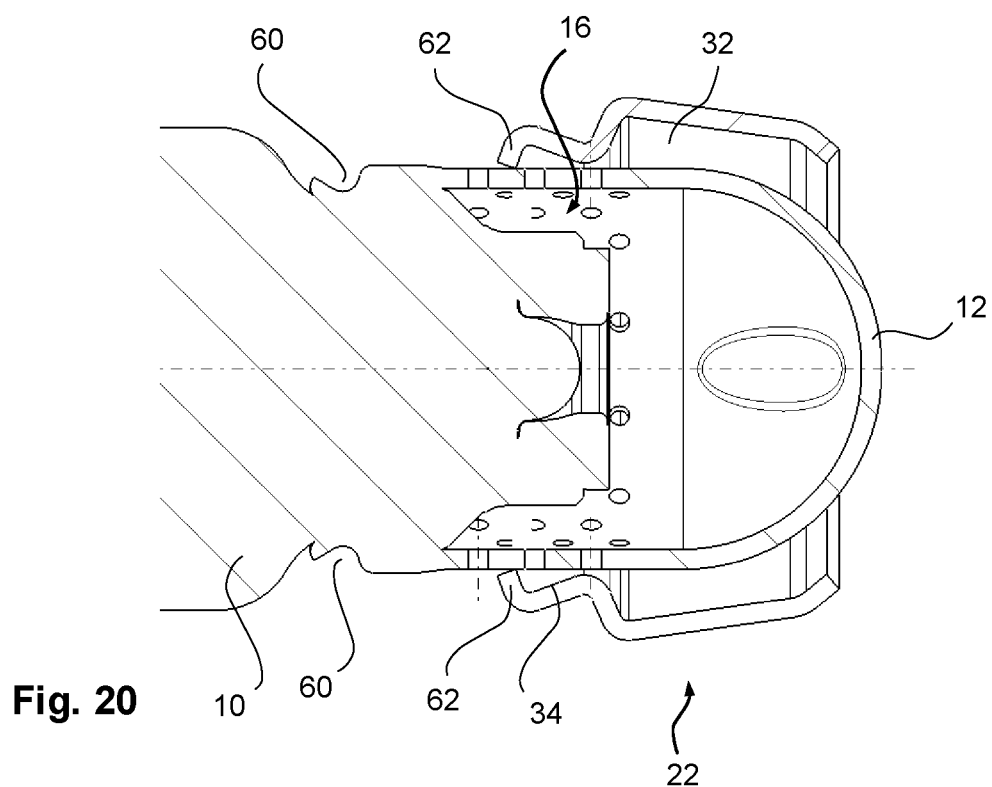
FIG. 20 shows a second schematic longitudinal section of the assembly from FIG. 16 during a mounting step of the diffusor.
Figure 21:
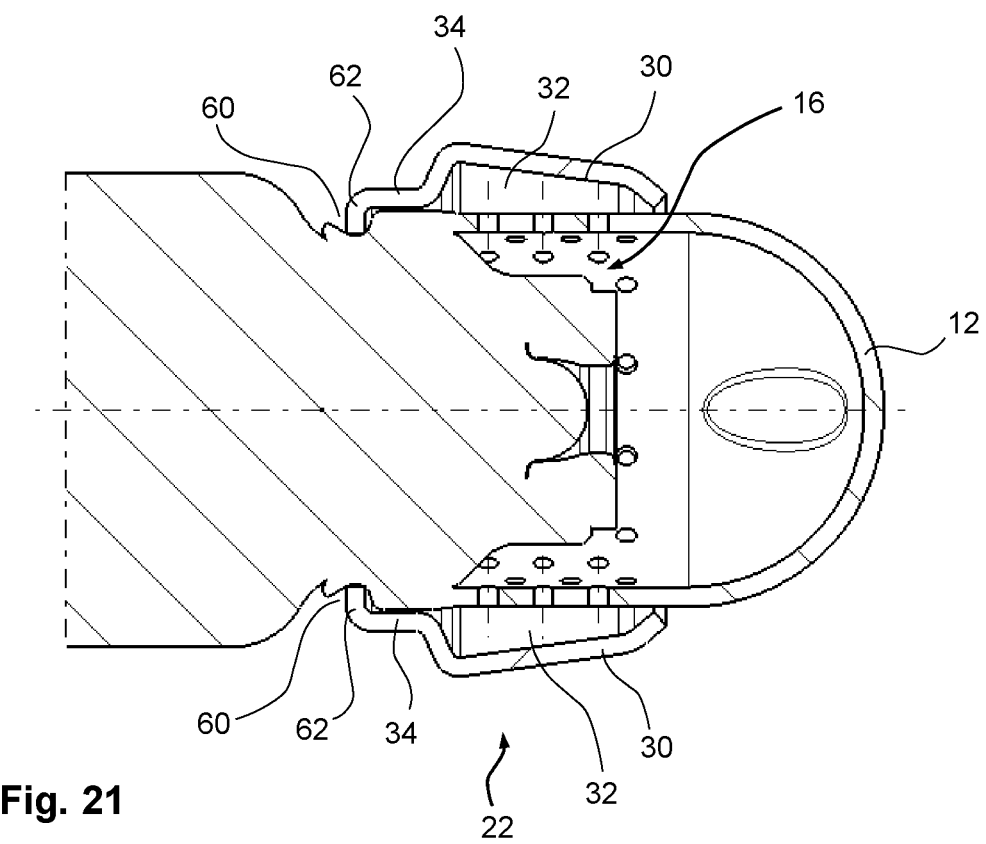
FIG. 21 shows the second schematic longitudinal section of the assembly from FIG. 16 after completion of the mounting of the diffusor.

FIGS. 20 and 21 illustrate a longitudinal section across the assembly 20 in an x-z plane at different times of the mounting of the diffusor 22 and the inflator 10.

FIG. 20 illustrates the assembly 20, while the diffusor 20 is slipped onto the inflator 22. The bearing surfaces 34 including the detent elements 62 are bent outward in the radial direction r when the diffusor 22 is slipped on. Said bending-open of the detent elements 62 is enabled especially by separating recesses 66 in the area of the rear bearing surface 34.

FIG. 21 illustrates the assembly 20 when the mounting is completed.

Accordingly, it is clearly evident that the detent elements 62 are engaged in the bead 60 of the inflator 10 and the diffusor 22 is thus locked to the inflator 10 in a simple manner. For fixing the diffusor 22 to the inflator 10, moreover the separation webs 33' forming the front bearing surfaces 34 may be configured to be bent at least slightly outward equally in the radial direction r when the diffusor is mounted. Thus, the separation webs 33' help generate, due to the inherent tension of the material in the mounted state, a pressing force directed to the central axis of the inflator 10 in the area of the front bearing surfaces 34. As a matter of course, the diffusor 22 can be additionally fixed to the inflator 10, apart from self-locking, by pressing or welding, for example.

All features of the individual embodiments can be combined with each other or exchanged for each other at the discretion of those skilled in the art, of course, with the desired application and the geometry of the inflator used having to be considered when selecting the shape of the diffusor.

The invention claimed is:

1. An assembly comprising:
an elongate inflator having an outer housing extending axially in a forward and rearward direction, the inflator comprising an outflow area including a plurality of outflow openings distributed about a circumference of the outer housing, the outflow openings being arranged in first and second outflow zones spaced axially along the length of the outflow area and separated by a separation area of the outflow area that is free from outflow openings;
a diffusor comprising a sheet of material that extends around the outer housing so as to cover the outflow area, the diffuser comprising a central bearing surface that engages the outer housing along the separation area to help connect the diffusor to the outer housing, the diffusor comprising a first collection chamber that extends axially rearward from the central bearing surface and covers the outflow openings of the first outflow zone, and a second collection chamber that extends axially forward from the central bearing surface and covers the outflow openings of the second outflow zone;
wherein the first collection chamber comprises a detent element that extends circumferentially around the outer housing and is received in a circumferential bead of the outer inflator housing to help connect the diffuser to the inflator, the first collection chamber further comprising a rear outlet opening that extends through the sheet of material;
wherein the second collection chamber is configured to converge radially upon the outflow area of the inflator and define a forward bearing surface, wherein the forward bearing surface engages the outer housing along a radially extending portion of the outer housing, and wherein the second collection chamber forms a forward outlet opening in the form of a radial gap where the forward bearing surface is spaced from the outer housing.

2. The assembly according to claim 1, wherein the outlet direction extends axially relating to a longitudinal axis of the inflator.

3. The assembly according to claim 1, wherein the at least one outlet opening comprises at least two outlet openings that are oppositely directed.

4. The assembly according to claim 1, wherein the at least one outlet opening comprises two or more oppositely directed outlet openings which are spaced apart from each other in a circumferential direction.

5. The assembly according to claim 1, wherein, adjacent to the at least one outlet opening, the gas guiding surface is located radially further outside than the at least one associated collecting chamber remote from the at least one outlet opening.

6. The assembly according to claim 1, wherein the at least one bearing surface delimits the at least one collecting chamber in at least one of the axial direction and the circumferential direction.

7. The assembly according to claim 1, wherein the at least one collecting chamber comprises one or more collecting chambers that do not continuously extend in the circumferential direction and which, at its two circumferential ends, opens into the at least one outlet opening.

8. The assembly according to claim 1, wherein two collecting chambers are provided each of which extends along the circumferential direction and each of which opens, at one circumferential end, into the at least one outlet opening.

9. The assembly according to claim 1, wherein the at least one bearing surface divides the gas flow exiting the inflator into at least two partial flows, wherein the bearing surface extends helically around the outer housing or only in the circumferential direction around the outer housing.

10. The assembly according to claim 1, wherein a bearing surface peripheral around the entire circumference of the inflator is provided which includes two first portions extending only along the circumferential direction and two second portions extending inclined to the circumferential direction and to the axial direction, the second portions connecting the first portions.

11. The assembly according to claim 1, wherein the outflow area is provided at a longitudinal end of the inflator.

12. The assembly according to claim 1, wherein the outflow area of the inflator is divided into at least two zones that are separated from each other by a separation area of the outer housing without outflow openings, wherein a bearing surface of the diffusor is positioned in the separation area between the zones.

13. The assembly according to claim 1, wherein the outlet openings are spread over the circumference and are separated by separation webs, wherein the separation webs at least partially form the at least one bearing surface which delimit the collecting chamber in the axial direction toward a longitudinal end of the inflator.

14. An airbag module comprising an airbag and an assembly according to claim 1, wherein the diffusor is arranged completely in an inflatable inner volume of the airbag.

15. A method for mounting an assembly according to claim 1, comprising the following steps:
a one-piece diffusor blank is fabricated of a sheet metal, wherein all bearing surfaces and all gas guiding surfaces are preformed,
the diffusor blank is bent around the outflow area of the inflator, wherein it adopts the final shape of the diffusor, and
portions of the diffusor blank are fixed to themselves so as to circumferentially close the diffusor blank.

16. A method for mounting an assembly according to claim 1, comprising the following steps:
a one-piece diffusor is fabricated of a one-piece closed tube element or of a sheet metal, with all of the bearing surfaces and all of the gas guiding surfaces being preformed,
the diffusor is slipped onto the outflow area of the inflator, and a bearing surface of the diffusor is plastically deformed in the area of a bead of the inflator, so that at least portions of the bearing surface engage in the bead along the circumference and a positive locking is formed.

17. A method for mounting an assembly according to claim 1, comprising the following steps:
a one-piece diffusor is fabricated of a closed tube element or of a sheet metal, wherein all of the bearing surfaces, all of the gas guiding surfaces and all of the detent elements are preformed,
the diffusor is slipped onto the outflow area of the inflator so that at least portions of the detent elements engage in the bead of the inflator along the circumference and a positive locking is formed.

18. The assembly according to claim 1, wherein a collecting chamber opening into an outlet opening 36b at an axial end is provided.

19. The assembly according to claim 18, wherein the outlet opening is formed by a radial gap between the outer housing and the inner side of the diffusor.

20. The assembly according to claim 1, wherein the diffusor comprises at least one detent element, wherein the detent element can engage in a bead for fastening and fixing the diffusor on the inflator.

21. The assembly according to claim 20, wherein the diffusor is made from spring steel.

* * * * *